Aug. 14, 1951 R. A. LIEN 2,564,336

RECORD CABINET

Filed Oct. 22, 1947 2 Sheets-Sheet 1

INVENTOR.
ROLAND A. LIEN
BY
Jerome W. Paxton
AGENT

RECORD CABINET

Filed Oct. 22, 1947

INVENTOR.
ROLAND A. LIEN
BY
Jerome W. Paxton
AGENT

Patented Aug. 14, 1951 2,564,336

UNITED STATES PATENT OFFICE 2,564,336

RECORD CABINET

Roland A. Lien, Austin, Minn.

Application October 22, 1947, Serial No. 781,359

5 Claims. (Cl. 312—273)

The present invention relates to cabinet constructions, and more particularly has reference to a cabinet for phonograph records which is so designed that the records are readily available for use when desired, and which supports the records in a manner to reduce to a minimum, access of dirt or other foreign matter and injury to the records.

Broadly, my invention comprises a cabinet structure having a drawer slidably mounted for movement therein. A record supporting member is connected in such a manner to the cabinet and drawer, that when the drawer is in its closed position, the record supporting member is so disposed that the records are maintained in a horizontal position, one upon the other. On the other hand, when the drawer of the cabinet is opened, the record supporting member is moved therewith so that the record supporting member rotates in a vertical direction through an arc of approximately 90 degrees, thus disposing the records in a vertical position whereby they may be easily removed from the supporting member. When the drawer is closed, the records are disposed in a horizontal position and hence are substantially free from dust and other injury.

An object of my invention is to provide a supporting device for phonograph records wherein the records are always maintained in a horizontal position when the cabinet is closed and in a vertical position when the cabinet is open.

A further object of my invention is to provide a supporting cabinet for phonograph records which is so designed that the records are maintained substantially free from injury through dust, dirt or warpage when the cabinet is closed.

And a further object of my invention is to provide a cabinet for supporting phonograph records having a movable drawer which is so designed that when the drawer is closed, the records are disposed in a horizontal position and when open, the records are in a vertical position.

Still a further object of my invention is to provide a record cabinet of the character described which is simple both in structural details and operation and which can be cheaply and easily manufactured.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Figure 1:
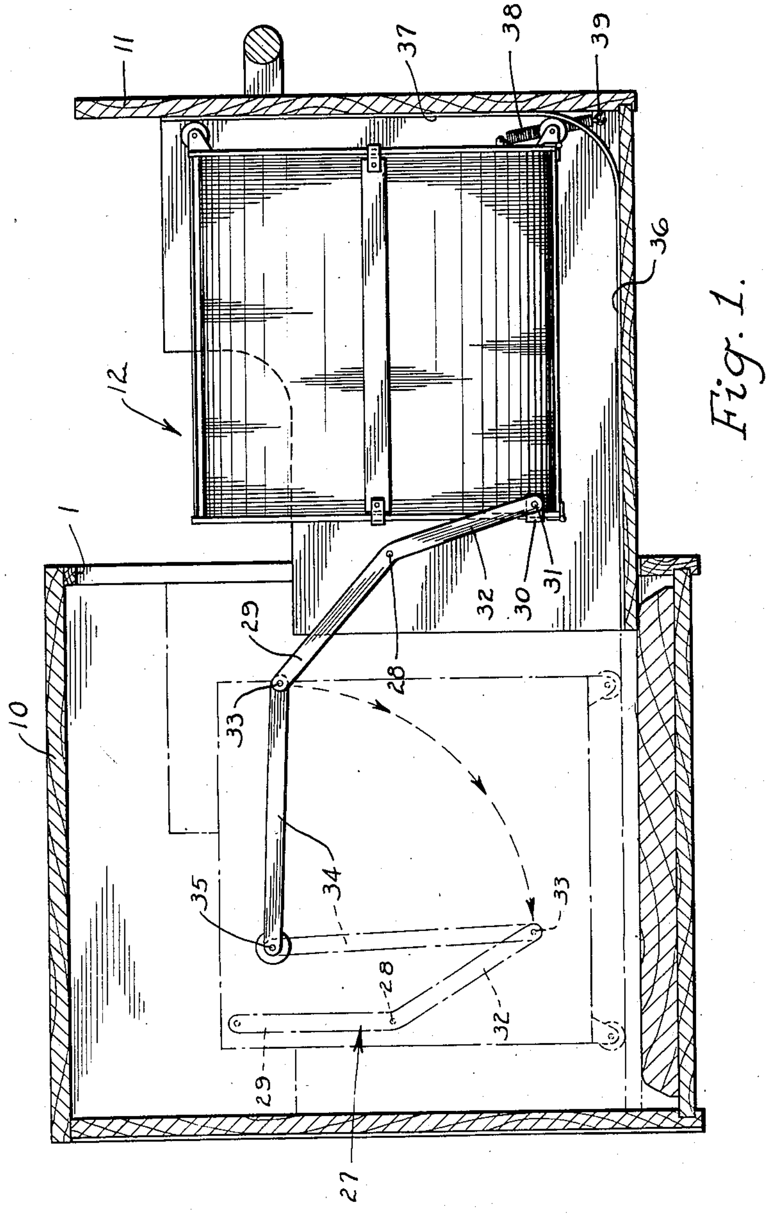
Figure 1 is a vertical sectional view of the phonograph cabinet showing the position of the record supporting member when the drawer is opened, the position of the record supporting member being shown in broken lines when the drawer is closed.

As shown in Figure 1, my record cabinet essentially comprises a cabinet 10 having a drawer 11 mounted for sliding movement into and out of the cabinet, and a record supporting member 12 suitably connected to the drawer and cabinet for movement with the drawer. The cabinet 10 and the drawer 11 may be made of any desirable material such as metal, wood, or the like, and may be of any desired configuration. The drawer may be mounted for sliding movement with respect to the cabinet 10 in any conventional manner.

Figures 3, 4:
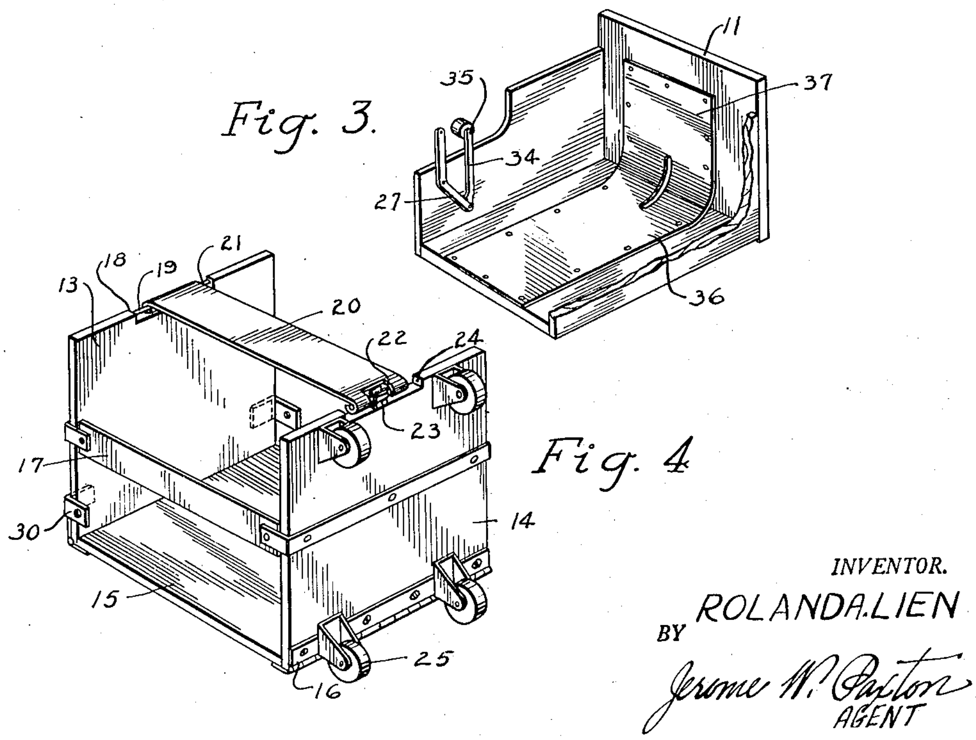
Figure 3 is a fragmental detail view of the drawer illustrating the trackways on which the casters of the record supporting member move.
Figure 4 is a perspective view of the record supporting member.

As best shown in Figure 4, the record supporting member designated 12 comprises upper and lower walls 13 and 14 and a rear wall 15 is connected to the upper and lower walls 13 and 14 by hinges 16. Straps 17 extend between the walls 13 and 14 intermediate the rear wall 15 and the opposite end of walls 13 and 14 and may be secured thereto in any convenient manner. The wall 13 is cut away, as shown at 18, and a rod or the like 19 is supported therein. A retaining strap 20 is suitably connected to the rod 19, as shown at 21, for providing pivotal movement of the strap 20 with respect to the wall 13. The opposite extremity of the strap 20 is provided with a rod 22 which is adapted to frictionally engage a catch 23 secured in cut-out portion 24 of the wall 14. A plurality of casters 25 of conventional type are carried by the wall 14, and the purpose thereof will later be more fully discussed.

As hereinabove mentioned, the record supporting member 12 is so connected to the drawer 11 as to move with the drawer upon its sliding movement into and out of the cabinet 10. It will be noted that a bell crank lever designated generally 27 is pivoted at 28 to each side wall of the drawer 11. Arm 29 of the bell crank lever is pivotally secured to an angle bracket 30 provided on the wall 13, as shown at 31. The other arm of the bell crank lever designated 32 is pivotally connected, as shown at 33, to an elongated link 34 which is fixedly mounted in the side wall of the cabinet 10, as shown at 35.

Figure 2:
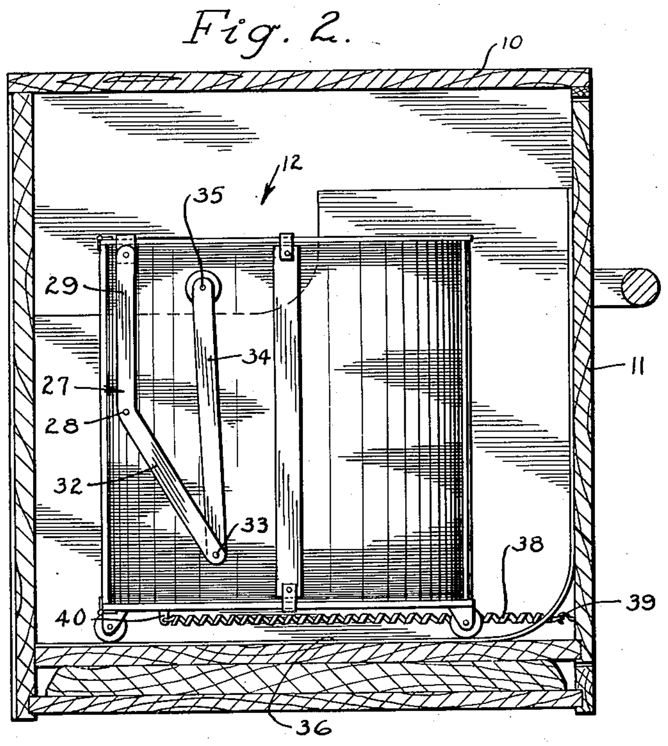
Figure 2 is a vertical sectional view showing the position of the record supporting member when the drawer is closed.

From Figure 2, it can be seen that when the drawer is closed, the record supporting member is in a position with its casters 25 resting upon a metal trackway 36 provided on the bottom wall of the drawer. The trackway 36 is curved upwardly at approximately 90 degrees, as shown at 37, adjacent the front wall of the drawer 11 and terminates a short distance from the upper edge of the front wall of the drawer. A helical spring 38 has one end thereof secured to the drawer, as shown at 39, and the opposite end thereof attached to a lug or the like 40 carried by the wall 14 of the record supporting member 12.

When it is desired to either fill the record supporting member with records or select records therefrom, the drawer 11 is moved outwardly from the cabinet 10. The spring 38 will assist the forward movement of the record supporting member 12, and the supporting member 12 will, by virtue of its casters 25, ride along the track 36, and due to the curved portion 37, the supporting member will be rotated approximately 90 degrees in a vertical direction, thus positioning the records in a vertical position for easy access. By disengaging the rod 22 from the catch 23, the strap 20 may be moved about its pivot 21 so that the records may be removed. Since the records are in a vertical position, the walls 13, 14 and 15 in conjunction with straps 17 will hold them in proper alignment. When the drawer is forced rearwardly into the cabinet, the bell crank 27, by virtue of its connection to the drawer 11, will cause arm 29 thereof to move rearwardly, upwardly and forwardly, thus imparting a 90 degree rotation to the record supporting member 12, thereby positioning the records in a horizontal position.

From the foregoing, it will be appreciated that I have provided a record cabinet wherein the records are stored in a horizontal position and yet when the cabinet is opened, the record supporting member is in a vertical position. The records are thus kept free from injury during storage and are readily accessible when desired for playing. The arrangement for moving the record supporting member through the 90 degree arc is relatively simple in construction, and the cost of manufacture and maintenance is comparatively low.

While I have described my inventive concept in connection with phonograph records, it will be apparent that it may be used for storage of other breakable items.

Although in the foregoing I have shown and described the preferred embodiment of my invention, I wish it to be understood that I may change the particular arrangement of the parts without in any way departing from the scope of the appended claims.

I claim:

1. In a cabinet for holding records or the like, a drawer movable into and out of the cabinet, a wheeled record carrier supported by the drawer, a curved member of approximately 90 degrees disposed at the front wall of the drawer and linkage connecting the record carrier to the cabinet and drawer whereby the record carrier is moved in a vertical direction through an arc of approximately 90 degrees when the drawer is moved out of the cabinet.

2. In a cabinet for holding records or the like, a drawer movable into and out of the cabinet, a record carrier, casters on the record carrier adapted to rest on the floor of the drawer, a curved member of approximately 90 degrees disposed at the front wall of the drawer, linkage connecting the record carrier to the cabinet and drawer, and spring means attached to the record carrier and the drawer whereby the record carrier is moved in a vertical direction through an arc of approximately 90 degrees when the drawer is moved out of the cabinet.

3. In a cabinet construction for holding records or the like, a drawer movable into and out of the cabinet, a track on the floor of the drawer, a curved portion of approximately 90 degrees in said track at the front wall of the drawer, a record carrier having casters adapted to ride on said track, linkage connecting said record carrier to the cabinet and the drawer, and spring means attached to the record carrier and the drawer so that when the drawer is moved out of the cabinet, the said spring means will aid in moving said record carrier along the track in a vertical direction through an arc of approximately 90 degrees.

4. In a cabinet construction for holding records or the like, a drawer movable into and out of the cabinet, a track on the floor of the drawer, a curve of approximately 90 degrees in said track at the front wall of the drawer, a record carrier having casters adapted to ride on said track, and linkage connecting the record carrier with the cabinet and the drawer whereby the carrier will ride along the track and be moved in a vertical direction through an arc of approximately 90 degrees by the curved portion of the track when the drawer is opened.

5. In a cabinet construction for holding records or the like, a drawer movable into and out of the cabinet, a track on the floor of the drawer, a curve of approximately 90 degrees in said track at the front wall of the drawer, a record carrier having casters adapted to ride on said track, linkage connecting the record carrier with the cabinet and drawer, and spring means attached to the carrier and the drawer to aid in moving said carrier along the track in a vertical direction through an arc of approximately 90 degrees when the carrier moves along the curved portion of the track when the drawer is opened.

ROLAND A. LIEN.

REFERENCES CITED

The following references are of record in the file of this patent:

UNITED STATES PATENTS

| Number | Name | Date |
|---|---|---|
| 580,844 | Brown et al. | Apr. 20, 1897 |
| 623,537 | Grange | Apr. 25, 1899 |
| 1,015,844 | School | Jan. 30, 1912 |
| 1,330,301 | Brown | Feb. 10, 1920 |
| 1,474,017 | Blaise | Nov. 13, 1923 |
| 2,331,655 | Colwill et al. | Oct. 12, 1943 |
| 2,343,409 | Goldberg | Mar. 7, 1944 |